(12) United States Patent
Grosskinsky et al.

(10) Patent No.: US 8,767,877 B2
(45) Date of Patent: Jul. 1, 2014

(54) CIRCUIT AND METHOD FOR CONTROLLING A RECEIVER CIRCUIT

(75) Inventors: Ulrich Grosskinsky, Neudenau (DE); Werner Blatz, Leingarten (DE)

(73) Assignee: Atmel Corporation, San Jose, CA (US)

( * ) Notice: Subject to any disclaimer, the term of this patent is extended or adjusted under 35 U.S.C. 154(b) by 619 days.

(21) Appl. No.: 12/720,317

(22) Filed: Mar. 9, 2010

(65) Prior Publication Data

US 2010/0232547 A1    Sep. 16, 2010

Related U.S. Application Data

(60) Provisional application No. 61/159,159, filed on Mar. 11, 2009.

(30) Foreign Application Priority Data

Mar. 10, 2009 (DE) .......................... 10 2009 011957

(51) Int. Cl.
*H04L 27/00* (2006.01)
*H03K 9/00* (2006.01)

(52) U.S. Cl.
USPC ........................................................ 375/316

(58) Field of Classification Search
USPC .................................. 375/294, 290, 271, 359
See application file for complete search history.

(56) References Cited

U.S. PATENT DOCUMENTS

| 4,112,264 | A | * | 9/1978 | Abramson et al. | 714/712 |
|---|---|---|---|---|---|
| 4,334,431 | A | * | 6/1982 | Kohno et al. | 73/597 |
| 5,970,447 | A | * | 10/1999 | Ireton | 704/233 |
| 6,978,149 | B1 | | 12/2005 | Morelli et al. | |
| 2002/0138111 | A1 | * | 9/2002 | Greenhut et al. | 607/27 |
| 2004/0000936 | A1 | * | 1/2004 | McCollum et al. | 327/156 |

* cited by examiner

*Primary Examiner* — Chieh M Fan
*Assistant Examiner* — Wednel Cadeau
(74) *Attorney, Agent, or Firm* — Baker Botts LLP

(57) ABSTRACT

A method for controlling a receiver circuit and circuit with a receiver circuit and with a control circuit is provided, whereby a received signal is demodulated and filtered. An amplitude value of the demodulated and filtered signal is compared with thresholds of a window comparator. A zero crossing of the demodulated and filtered signal is compared with time thresholds of a time window by a comparison unit. A first output value of the window comparator and a second output value of the comparison unit are logically combined, and wherein, via the logical combination, the receiver circuit is turned off if, within a period of time, the amplitude value is determined to be outside a window formed by the thresholds of the window comparator, or a zero crossing is determined to be outside the time window.

19 Claims, 3 Drawing Sheets

CIRCUIT AND METHOD FOR CONTROLLING A RECEIVER CIRCUIT

This nonprovisional application claims priority to German Patent Application No. DE 10 2009 011 957.4, which was filed in Germany on Mar. 10, 2009, and to U.S. Provisional Application No. 61/159,159, which was filed on Mar. 11, 2009, and which are both herein incorporated by reference.

BACKGROUND OF THE INVENTION

1. Field of the Invention

The present invention relates to a circuit and a method for controlling a receiver circuit.

2. Description of the Background Art

By means of a receiver circuit, a radio connection can be implemented between a transmitter and a receiver having the receiver circuit. The receiver circuit may be operated with a battery, for example. In this context, the longest possible operating life using the battery is desirable, wherein the operating life depends on the capacity of the battery and the power consumption of the receiver circuit.

SUMMARY OF THE INVENTION

It is therefore an object of the invention to provide a circuit with a receiver circuit and a control circuit, whereby the circuit can be monolithically integrated on a semiconductor chip.

The circuit has a receiver circuit for receiving a signal. The receiver circuit can be configured to receive a signal transmitted by radio, and can have an antenna input. Alternatively, the signal could also be transmitted through wires or optically.

The circuit has a control circuit for controlling the receiver circuit. The control circuit can be configured to at least turn on and turn off the receiver function of the receiver circuit.

The receiver circuit has a demodulator and a filter, which can be digital, for demodulation and filtering of the received signal. Further, the receiver circuit can have an analog-to-digital converter that precedes the demodulator and filter so that time-discrete values are demodulated and filtered. The filter can have a low-pass characteristic or a bandpass characteristic.

The control circuit has a window comparator connected to the filter for comparing an amplitude value of the demodulated and filtered signal with thresholds of the window comparator. The window comparator has an input for setting the thresholds. A valid signal is then present when the amplitude value is determined to be within the thresholds, for example at a predetermined sampling time or within multiple sampling times.

The control circuit has a comparison unit for comparing the time of a zero crossing with time thresholds of a time window. The comparison unit has an input for setting the time thresholds. By means of the time thresholds, it is determined for a valid signal that a zero crossing of the valid signal must take place within the time thresholds, which is to say within the time window.

The control circuit has a logic unit connected to the window comparator and to the comparison unit, and has a control output connected to the receiver circuit for switching off the receiver circuit. The control circuit is configured to switch off the receiver circuit in the event of a change in a first output value of the window comparator or a second output value of the comparison unit. The logic unit has a logical OR combination of the first output value of the window comparator and the second output value of the comparison unit.

The invention has the additional object of providing a method for control that is improved to the greatest degree possible. Accordingly, a method for controlling a receiver circuit is provided.

In the method, a received signal is demodulated and filtered. Beforehand, additional receiving steps may take place, such as an amplification or a down-conversion to an intermediate frequency or an analog-to-digital conversion, for example.

An amplitude value of the demodulated and filtered signal is compared with thresholds of a window comparator. Amplitude value can be understood to mean a maximum distance from a zero value of the demodulated and filtered signal.

In addition, a zero crossing of the demodulated and filtered signal is compared with time thresholds of a time window by a comparison unit. An amplitude value can be determined between two zero crossings that have been detected and compared with the time window.

A first output value of the window comparator and a second output value of the comparison unit are logically combined. For example, the first output value and the second output value are combined through a logic OR.

By means of the logical combination, the receiver circuit is turned off if, within a period of time, the amplitude value is determined to be outside a window formed by the thresholds of the window comparator, or a zero crossing is detected outside the time window. In contrast, the receiver circuit remains turned on if the amplitude value is determined to be within the window formed by the thresholds of the window comparator and the zero crossing is detected within the time window.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
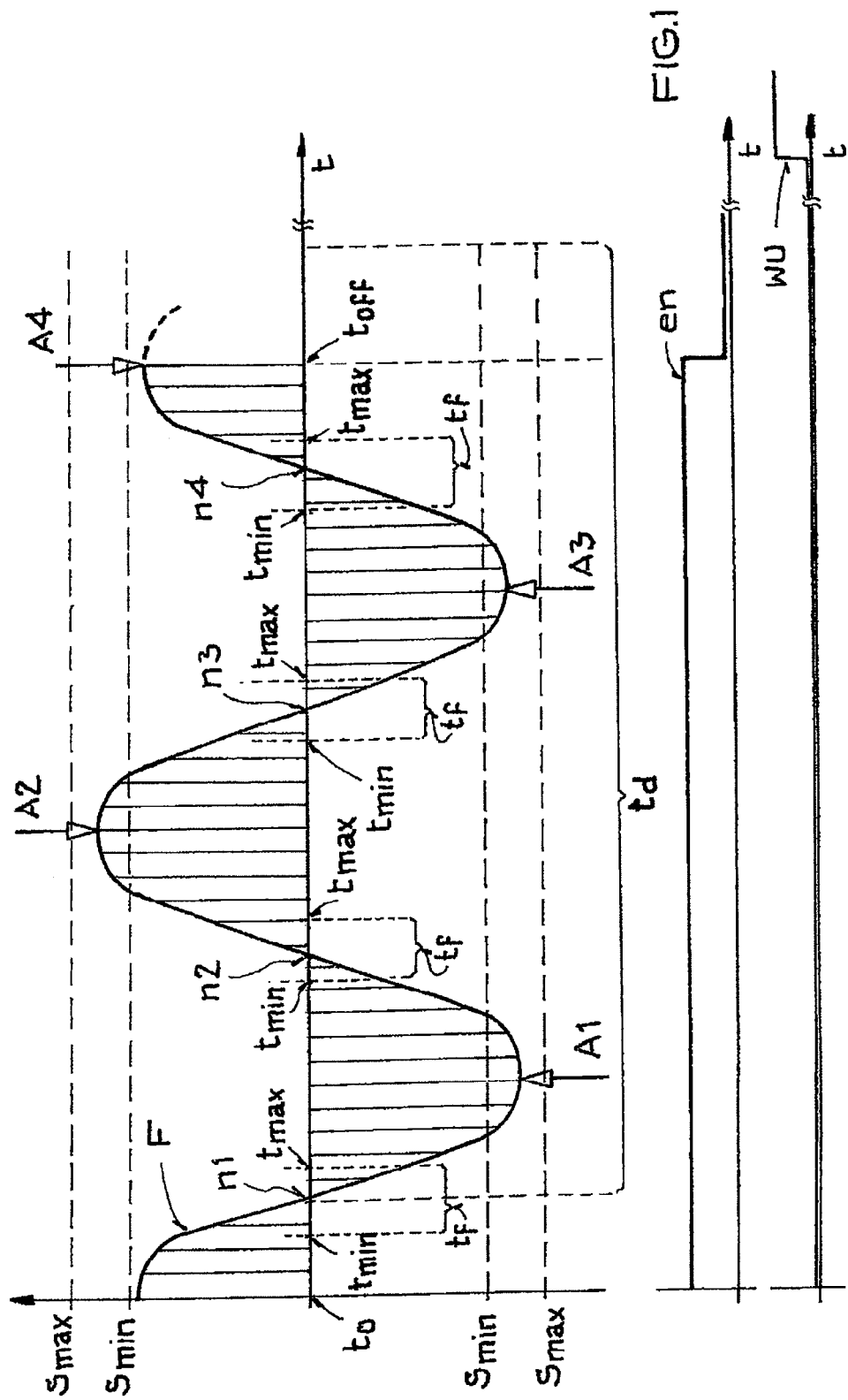
FIG. 1 is a schematic diagram.

FIG. 1 shows a signal F, which is demodulated by a digital demodulator and filtered by a digital filter. It has discrete values, which are present at sampling times. The sampling times are indicated by equidistant lines on the time axis t. The value curve of the signal F has positive and negative values. Shown schematically is the signal F for a curve that has a number of zero crossings n1, n2, n3 and n4. In addition, the curve of the signal F has multiple amplitude values A1, A2, A3, A4 (maxima).

A method for controlling a receiver circuit is provided which is explained in detail with reference to the diagram in FIG. 1.

Each amplitude value A1, A2, A3, A4 of the demodulated and filtered signal F is compared with thresholds Smin and Smax of a window comparator. In this context, the threshold Smin with the smaller magnitude defines a minimum amplitude threshold value that must be reached by the signal F, and the threshold Smax with the larger magnitude defines a maximum amplitude threshold value that must not be exceeded by the signal F. In this way it is determined that the received signal is valid, which is to say meets a predetermined specification. In the example shown, the amplitude values A1, A2, A3, A4 are the maximum discrete values of the signal F.

Each zero crossing n1, n2, n3, n4 of the demodulated and filtered signal F is compared with time thresholds tmin and tmax of a time window tf by a comparison unit. The zero crossing n1, n2, n3, n4 of the signal F must not lie outside the time window tf defined by the time thresholds tmin, tmax; only when the zero crossing n1, n2, n3, n4 of the signal F takes place within the time window tf is the signal F recognized as valid for the predetermined specification.

The comparison of each amplitude value A1, A2, A3, A4 with the thresholds Smin and Smax is evaluated in combination with the comparison of the zero crossings n1, n2, n3, n4 with the time thresholds tmin, tmax. To this end, a first output value of the window comparator with the thresholds Smin, Smax and a second output value of the comparison unit with the time thresholds tmin, tmax are logically combined.

By means of the logical combination, the receiver circuit is switched off by a control signal en if the receiver circuit is turned off if, within a period of time td, the amplitude value A1, A2, A3, A4 is determined to be outside a window formed by the thresholds Smin, Smax of the window comparator, or a zero crossing n1, n2, n3, n4 is detected outside the time window tf. The exemplary embodiment shown in FIG. 1 shows by way of example that the amplitude value A4 of the demodulated and filtered signal F is below the threshold Smin of the window comparator at the point in time toff. At this point in time toff, the amplitude is thus too low. As a function of this comparison result, an edge of the control signal en is generated that aborts the receiving process by turning off the control circuit. In the exemplary embodiment in FIG. 1, the control signal en switches from a high voltage to a low voltage.

The time period td is preferably set in accordance with the predetermined specification. For example, the time period td can be defined from the first zero crossing n1 to the sixth zero crossing (not shown) or by a specified number of samples. If a valid signal F is detected during the entire time period td, no turnoff of the receiver circuit takes place. Subsequently a wakeup signal is generated, so that a computing unit, such as a microcontroller for example, is awakened by the wakeup signal WU. In FIG. 1, the (later) edge transition of the wakeup signal WU at the point in time tWU is shown by way of example for the case of a valid signal F.

After turnoff, the receiver circuit is turned on again (polling) after a predetermined length of time in order to again test a receive signal with respect to the thresholds Smin, Smax and the time thresholds tmin, tmax.

The evaluation of the zero crossing n1, n2, n3, n4 with respect to the time window, and at the same time the evaluation of the amplitude values A1, A2, A3, A4 with respect to the thresholds Smin, Smax, has the surprising effect that after only a very short time, for example after the first zero crossing n1, an invalid signal can be detected immediately by means of the first amplitude value A1. By this means, the time of the power consumption by the receiver circuit during the beginning of a demodulation can be considerably shortened, and thus the average total power consumption by the receiver circuit can be considerably reduced.

Figure 2:
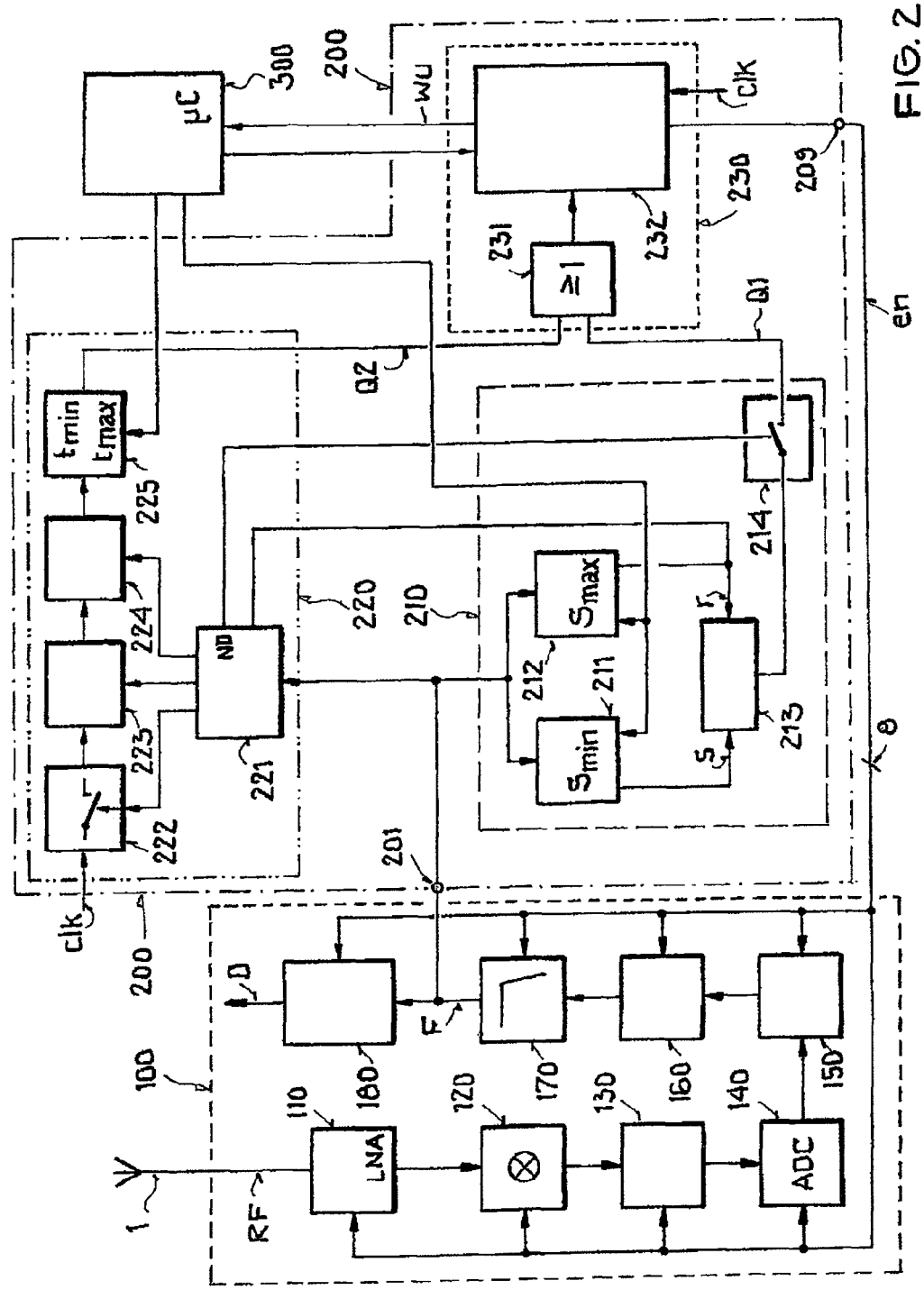
FIG. 2 is a schematic block diagram with a receiver circuit and a control circuit.

FIG. 2 schematically shows a schematic block diagram of a circuit for a receiver system. The circuit has a receiver circuit 100, a control circuit 200 controlling the receiver circuit 100, and a microcontroller 300. An antenna 1 is connected to the receiver circuit 100, so that the receiver circuit 100 is designed to receive the radio signal RF. In the exemplary embodiment in FIG. 1, the receiver circuit 100 has an input amplifier 110 (LNA, Low Noise Amplifier), a mixer 120, an analog filter 130, an analog-to-digital converter 140 (ADC), a digital filter 150, a digital demodulator 160, a digital filter 170 for generating a moving average, and a discriminator 180 to output the received data D. The digital filter 170 has at least a low-pass characteristic. The demodulated and filtered signal F is present at an output of the digital filter 170 and at the input 201 of the control circuit 200.

For analysis of the signal F, the control circuit 200 has a window comparator 210 with thresholds Smin and Smax for analyzing amplitude values A1, A2, A3, A4 (see also FIG. 1). The thresholds Smin and Smax are implemented by two digital comparators 211 and 212 in the exemplary embodiment shown in FIG. 2. The thresholds Smin and Smax can be changed by the microcontroller 300 in accordance with the predetermined specification for the signal to be received.

Connected to the outputs of the two comparators 211, 212 is an RS flip-flop 213, which is set by the output signal s of the comparator 211 and is reset by the output signal r of the comparator 212. The output signal of the RS flip-flop 213 is supplied to a control logic unit 230 via a switching means 214 as the first output signal Q1 of the window comparator 210.

The control circuit 200 also has a digital comparison unit 220. The digital comparison unit 220 has a zero-crossing detector 221, whose output is connected to the input 201 of the control circuit 200. The zero-crossing detector 221 is designed to detect a zero crossing n1, n2, n3, n4 (see FIG. 1) of the signal F between two sampled values. As a function of the detected zero crossing, the switching means 214 is activated a number of samples later and the first output signal Q1 of the window comparator 210 is output. With a subsequent clock pulse of the sampling, the RS flip-flop 213 is reset by a reset signal r of the zero-crossing detector 221.

In addition, the zero-crossing detector 221 in the exemplary embodiment in FIG. 2 controls a switching means 222 that is supplied with the sampling clock clk. Immediately after the detection of a zero crossing n1, n2, n3, n4, the switching means 222 is activated by the zero-crossing detector 221 so that the sampling clock clk arrives at a counter 223 that counts the samples until the next zero crossing. The count value at the next zero crossing is stored in a register 224 under the control of the zero-crossing detector 221. Thereafter, the zero-crossing detector 221 resets the counter 223 to a starting value. The stored register value is compared by a digital comparator 225 with a first time threshold tmin and a second time threshold tmax. The output signal of the digital comparator 225 is supplied to an input of the control logic unit 230 as the second output signal Q2 of the comparison unit 220.

The logic unit 230 is connected to the window comparator 210 and the comparison unit 220. The logic unit 230 has a control output 209 connected to the receiver circuit 100 for switching off the receiver circuit 100 in the event of a change in the first output value Q1 of the window comparator 210 or in a second output value Q2 of the comparison unit 220. For this purpose, the first output value Q1 of the window comparator 210 and the second output value Q2 of the comparison unit 220 are combined through a logic OR. For the logical OR combination, the logic unit 230 has an OR gate 231, for example. The logical OR combination has the effect that the receiver circuit 100 is switched off by means of the control signal en if, within a period of time td, the amplitude value A1, A2, A3, A4 is determined to be outside a window formed by the thresholds Smin, Smax of the window comparator 210, or a zero crossing n1, n2, n3, n4 is determined to be outside the time window tf.

In addition, the logic unit 230 has a clock-controlled computing unit 232. The clock-controlled computing unit 232 switches off the receiver circuit 100 in an event-dependent or time-dependent manner—in particular cyclically (polling)—in order to initiate a receive process. The control circuit 200 could also be turned on and off by the logic unit 230. Moreover, in the presence of a signal F that has been recognized as valid, the clock-controlled computing unit 232 generates, as a function of the OR combination and a time interval determination by means of the sampling signal clk, a wakeup signal WU to wake up the microcontroller 300 (uC). Once the microcontroller 300 has been awakened, it can analyze the data D. For example, an identifier (ID) is analyzed by the microcontroller 300, and in the event of a match, the additional data D are evaluated. If the received identifier is incorrect, the microcontroller 300 switches off the receiver circuit 100 through the logic unit 230 of the control circuit 200, and drives itself into a sleep mode.

Figure 3:
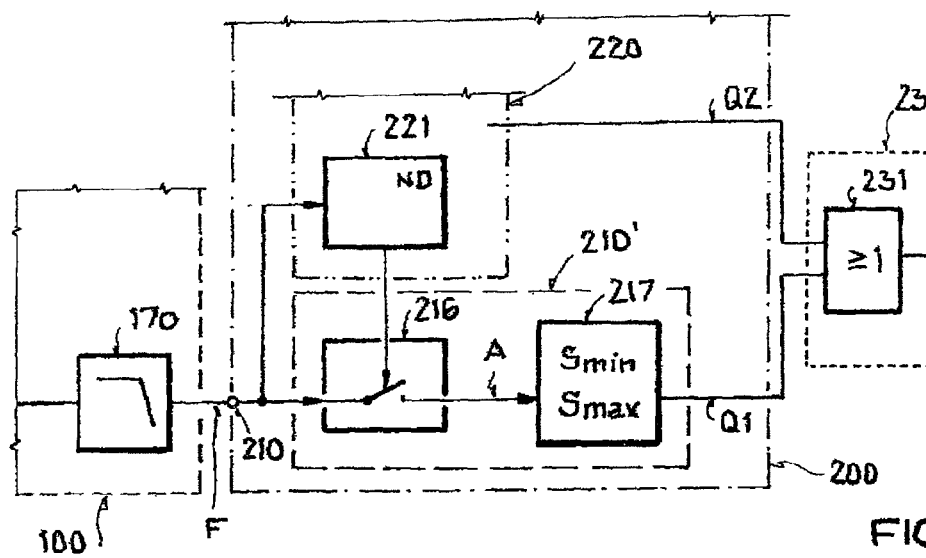
FIG. 3 is a schematic block diagram of another exemplary embodiment of a control circuit.

FIG. 3 shows an alternative exemplary embodiment of an analysis circuit 200 with a simplified window comparator 210'. Here, the zero crossing detector 221 determines, as a function of the detected zero crossing n1, n2, n3, n4, a sampling time when the amplitude value A, A1, A2, A3, A4 is to be analyzed and at this sampling time drives a switching means 216, which connects the input 201 of the control circuit 200 to a digital comparator 217 with two thresholds Smin and Smax. The digital comparator 217 outputs, directly at its output, the first output value Q1 of the window comparator 210.

Figure 4:
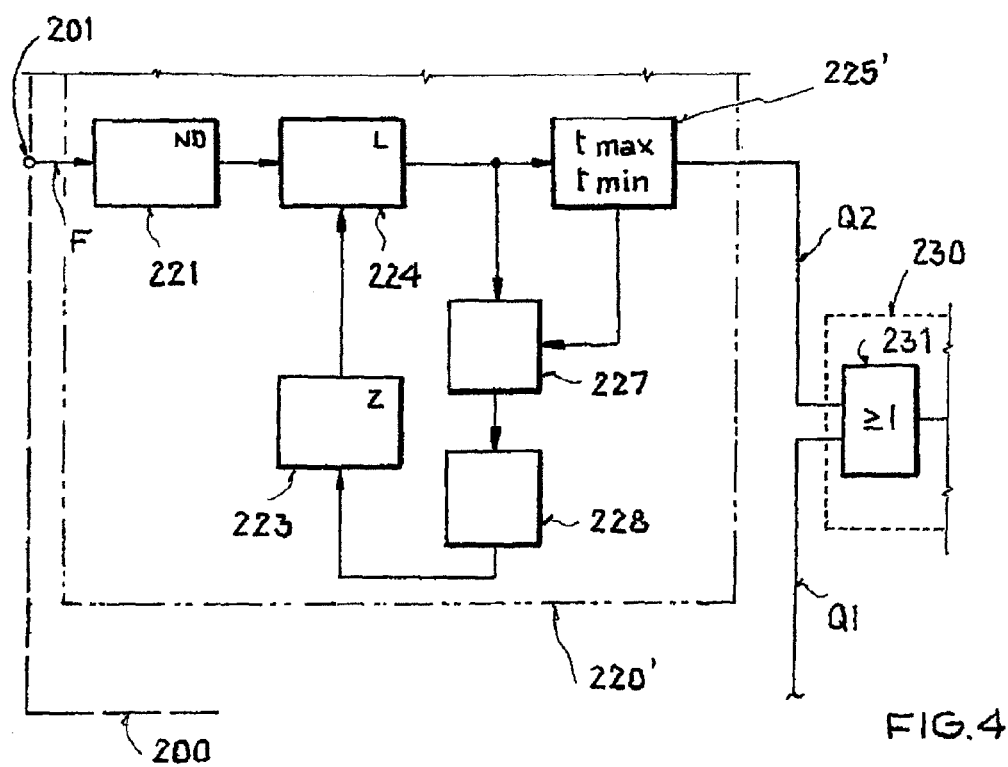
FIG. 4 is a schematic block diagram of another exemplary embodiment of a control circuit.

FIG. 4 shows an alternative exemplary embodiment of a digital comparison unit 220'. A zero crossing detector 221 is again connected to the input 201 of the control circuit 200. When a zero crossing n1, n2, n3, n4 is detected, the zero crossing detector 221 drives the latch/register 224, which stores the counter value at the output of a modulo-N counter 223 at the time of the zero crossing n1, n2, n3, n4. The counter 223 functions as an integrator. The counter 223 is not reset, but instead has an overflow. For example, the counter 223 overflows at $2^N$, for example 32 or 64. Preferably the counter 223 outputs positive and negative values and when counting up overflows accordingly from the largest positive value to the largest negative value.

The latch/register 224, the loop elements 227, 228, and the counter 223 constitute a control loop. In this context, the loop elements 227, 228 change the parameters of the control loop, such as the counting rate and phase. The counting rate and/or phase start value are preset with regard to the expected data rate by the loop elements 227, 228. Deviations in counting rate and phase that occur during operation are adjusted by the control loop.

Also provided is a digital comparator 225' with the time thresholds tmin (for example, −8) and tmax (for example, +8). The time thresholds define a permissible time deviation of the zero crossing n1, n2, n3, n4 from the expected value. If the zero crossing n1, n2, n3, n4 is within the time window tf defined by the time thresholds tmin, tmax of the digital comparator 225', the output signal Q2 is not changed, so that receiving is continued and the receiver circuit 100 is not switched off. In contrast, if a zero crossing n1, n2, n3, n4 is outside of the time window tf, the receiver circuit 100 is switched off. By means of the exemplary embodiment shown in FIG. 4, the average power consumption can be considerably reduced by means of a simple implementation, since a reception of a signal that does not correspond to the predefined parameters of amplitude or zero crossing—hence is invalid—can be terminated early.

If a signal has already been recognized as valid, turnoff of the receiver circuit 100 is set to an inactive state. Now if a zero crossing n1, n2, n3, n4 occurs outside of the time window tf, the receiver circuit 100 remains turned on and the error can be analyzed by an analysis circuit 300. However, a zero crossing n1, n2, n3, n4 outside of the time window tf should not result in a change in the control state of the control loop, so that an outlier of this nature should be masked off. To this end, the loop element 227 has a switching function that deactivates the control action of the control loop for zero crossing n1, n2, n3, n4 outside of the time window tf. In this way, individual outliers during regulation are masked off. For example, the loop element is a variable proportional element, wherein a proportionality factor of the proportional element 227 is set to zero in the event of an outlier so that the counting rate and phase remain unchanged.

The invention is not restricted to the variant embodiments shown in FIGS. 1 through 4. For example, it is possible to provide a moving average for precalculation of a time value for a zero crossing from multiple past time values in place of the PLL-like control loop from FIG. 4. It is especially preferred for the invention to be used for a battery-operated radio system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a receiver circuit, the method comprising:
    demodulating and filtering a received signal;
    comparing an amplitude value of the demodulated and filtered signal with thresholds of a window comparator;
    comparing a time of a zero crossing of the demodulated and filtered signal with time thresholds of a time window via a comparison unit to determine whether the zero crossing occurs within the time window;
    combining logically a first output value of the window comparator and a second output value of the comparison unit, the first output value based on the comparing the amplitude value of the demodulated and filtered signal with thresholds of the window comparator and the second output value based on the comparing the time of the zero crossing of the demodulated and filtered signal with the time thresholds of the time window; and
    turning off, based on the combining logically the first output value of the window comparator and the second output value of the comparison unit, the receiver circuit if the amplitude value is determined to be outside a window formed by the thresholds of the window comparator within a period of time or a zero crossing is determined to be outside the time window within the period of time.

2. The method of claim 1, further comprising storing in a memory an exceedance of a threshold by the amplitude value.

3. The method of claim 1, further comprising precalculating a zero crossing from multiple prior zero crossings.

4. The method of claim 1, wherein the comparison unit is a closed loop.

5. The method of claim 1, further comprising coupling respective outputs of the window comparator and the comparison unit to respective inputs of either a logic gate or an OR gate.

6. The method of claim 1, wherein the window comparator has an input for setting the time thresholds.

7. The method of claim 1, wherein the comparison unit has an input for setting the thresholds.

8. The method of claim 1, further comprising generating a wakeup signal as a function of the first output value of the window comparator and the second output value of the comparison unit.

9. The method of claim 2, wherein the memory is a flip-flop.

10. A circuit comprising:
a receiver circuit configured to receive a signal, the receiver circuit having a demodulator and a filter for demodulation and filtering of the received signal; and
a control circuit configured to control the receiver circuit, the control circuit comprising:
a window comparator connectable to the filter and configured to compare an amplitude value of the demodulated and filtered signal with thresholds of the window comparator;
a comparison unit configured to compare a time of a zero crossing with time thresholds of a time window to determine whether the zero crossing occurs within the time window;
a logic unit connectable to the window comparator and the comparison unit, the logic unit having a control output connectable to the receiver circuit for switching off, based on combining logically a first output value of the window comparator and a second output value of the comparison unit, the receiver circuit in an event of a change in the first output value of the window comparator or of a change in the second output value of the comparison unit, the first output value based on the comparing the amplitude value of the demodulated and filtered signal with thresholds of the window comparator and the second output value based on the comparing the time of the zero crossing of the demodulated and filtered signal with the time thresholds of the time window.

11. The circuit according to claim 10, wherein the window comparator has a memory that is configured to store an exceedance of a threshold by the amplitude value.

12. The circuit according to claim 10, wherein the comparison unit has a circuit section for precalculating a zero crossing from multiple prior zero crossings.

13. The circuit according to claim 10, wherein the logic unit has a logic gate or an OR gate connectable to the window comparator and to the comparison unit.

14. The circuit according to claim 10, wherein the window comparator has an input for setting the thresholds.

15. The circuit according to claim 10, wherein the comparison unit has an input for setting the time thresholds.

16. The circuit according to claim 10, wherein the control circuit is configured for time-dependent and/or cyclic and/or event-dependent turn-on of the receiver circuit.

17. The circuit according to claim 10, wherein the control circuit is configured to generate a wakeup signal as a function of the first output value of the window comparator and the second output value of the comparison unit.

18. The circuit according to claim 12, wherein the circuit section is a closed loop.

19. A circuit comprising:
a receiver circuit configured to receive a signal, the receiver circuit having a demodulator and a filter for demodulation and filtering of the received signal; and
a control circuit configured to control the receiver circuit, the control circuit comprising:
a window comparator connectable to the filter and configured to compare an amplitude value of the demodulated and filtered signal with thresholds of the window comparator;
a comparison unit configured to compare a time of a zero crossing with time thresholds of a time window to determine whether the zero crossing occurs within the time window;
a logic unit connectable to the window comparator and the comparison unit, the logic unit having a control output connectable to the receiver circuit for switching off, based on combining logically a first output value of the window comparator and a second output value of the comparison unit, the receiver circuit in an event of a change in the first output value of the window comparator or of a change in the second output value of the comparison unit, the first output value based on the comparing the amplitude value of the demodulated and filtered signal with thresholds of the window comparator and the second output value based on the comparing the time of the zero crossing of the demodulated and filtered signal with the time thresholds of the time window;
wherein the window comparator has a memory that is configured to store an exceedance of a threshold by the amplitude value; and
wherein the memory is a flip-flop.

* * * * *